UNITED STATES PATENT OFFICE.

PETER B. DOTY, OF CONNEAUT, OHIO.

IMPROVEMENT IN ARTIFICIAL STONE.

Specification forming part of Letters Patent No. 168,559, dated October 11, 1875; application filed September 17, 1875.

*To all whom it may concern:*

Be it known that I, PETER P. DOTY, of Conneaut, Ashtabula county, Ohio, have invented a new and useful Improvement in Manufacture of Artificial Stone, of which the following is a specification:

My invention consists of an artificial stone composed of sand, slaked lime, uncalcined pulverized plaster, resin, coal-tar, and sulphate of iron.

I take of sand, one bushel; of slaked lime, one-half bushel; of uncalcined pulverized plaster, one-half bushel; of resin, twenty pounds; of coal-tar, ten pounds, and of sulphate of iron, one-half pound. The sand, lime, and plaster are mixed together either before or while being heated for use. The resin, coal-tar, and sulphate of iron are heated together, and when all of the ingredients are sufficiently heated the same are placed in a mixing-machine, and, after being thoroughly mixed together therein, are put into forms and pressed into such shape as may be desired for use. The extent to which the ingredients are heated is judged by the apparent condition, and will be governed by the experience of the operator.

I do not confine myself, however, to the use of sulphate of iron, for good hard stones may be made or produced without it; nor do I limit myself to the proportions of ingredients stated, as they may be varied within certain limits with good results.

Having thus described my invention, I claim as new and desire to secure by Letters Patent—

The combination of sand, slaked lime, uncalcined pulverized plaster, resin, coal-tar, and sulphate of iron for the manufacture of artificial stone, substantially in the manner herein described.

PETER B. DOTY.

Witnesses:
    ALLEN M. COX,
    JOHN E. GEROULET.